Jan. 12, 1954

S. JOANIS 2,665,777

AUXILIARY HYDRAULIC BRAKE SYSTEM

Filed April 28, 1950

INVENTOR
Steve Joanis by Edward N. Fetherstonhaugh
ATTORNEY

Jan. 12, 1954 S. JOANIS 2,665,777
AUXILIARY HYDRAULIC BRAKE SYSTEM
Filed April 28, 1950 2 Sheets-Sheet 2

INVENTOR
Steve Joanis
by Edward N. Fetherstonhaugh
ATTORNEY

UNITED STATES PATENT OFFICE 2,665,777

AUXILIARY HYDRAULIC BRAKE SYSTEM

Steve Joanis, Windsor, Ontario, Canada

Application April 28, 1950, Serial No. 158,739

3 Claims. (Cl. 188—152)

The invention relates to improvements in an auxiliary hydraulic brake system as described in the present specification and illustrated in the accompanying drawings that form a part of the same.

The invention consists essentially of the novel features in construction as pointed out broadly and specifically in the claims for novelty following a description containing an explanation in detail of acceptable forms of the invention.

The objects of the invention are to devise an auxiliary hydraulic brake system which is automatically put in use should failure or leakage occur in the master cylinder of the main system or anywhere else in the system; to furnish a secondary hydraulic brake system for motor vehicles, having a hydraulic pump for emergency use and by which fluid feeds to the brakes should a leak or other breakdown occur in the master cylinder of the main brake system; the brake pedal automatically engaging the auxiliary system; to assure the working of the hydraulic brakes of a motor vehicle through the movement of the brake pedal when leakage occurs in the main system; to add to the safety of driving motor vehicles; to construct an auxiliary hydraulic brake system consisting of comparatively few and simple parts and easily installed in a motor vehicle; and generally to provide an auxiliary hydraulic brake system that is dependable and efficient in its use.

In the drawings.

Like numerals of reference indicate corresponding parts in the various figures.

Figure 1:
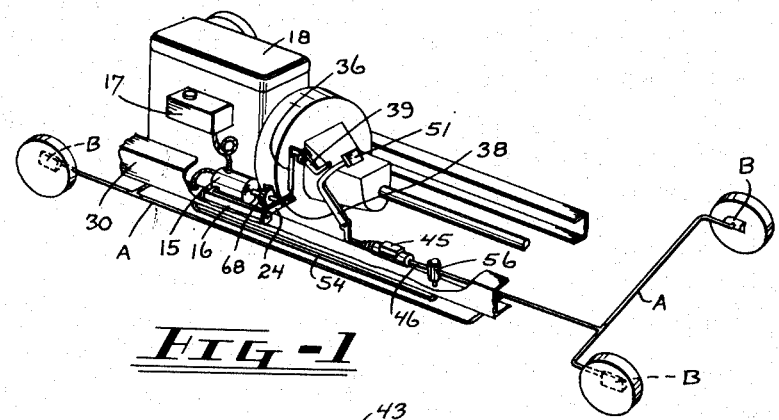
Figure 1 is a diagrammatic view of the hydraulic brake system and the auxiliary hydraulic brake system of a motor vehicle.

Referring to the drawings, the auxiliary hydraulic brake system is made of a pump unit comprising a hydraulic pump, as indicated by the numeral 15, fixedly secured to a bracket mounting 16 secured to the frame of the vehicle under the engine hood, and having an auxiliary fluid tank 17 mounted on the engine 18 above the level of the pump, and being connected to the same by means of a connection, in this instance, a hose member 19 connected to the outlet 20 in the bottom of the tank and leading therefrom to the inlet 21 in the top of the pump.

The pump mounting bracket or brace 16 consists of a longitudinal section 22 which is bent to form outwardly projecting ends or arms, 23 and 24, the arm 23 being comparatively short while the arm 24 is of considerable length. The bracket is positioned between two rigid legs or supports, 25 and 26 respectively, fixedly secured to the frame of the vehicle and extending vertically upward therefrom, the arms 23 and 24 of the bracket being directed inward towards the engine. The bracket is pivotally mounted to the legs 25 and 26 by means of the bolts 28 and 29 respectively, and is positioned above the framework 30.

The pump 15 is suitably and fixedly or rigidly secured to the short arm 23 of the bracket, being forward of the flywheel 31 of the motor. A pump shaft 32 extends outward from the pump and having its outer end rotatably secured in the arm 24 of the bracket, at 33, being located approximately midway along the arm. The arm 24 is positioned slightly to the rear of the flywheel casing 34.

A driving wheel 35 is fixedly secured on the pump shaft 32 to revolve therewith and being in alignment with the edge of the flywheel 31, the edge of the driving wheel normally being spaced apart from the flywheel.

Figure 2:
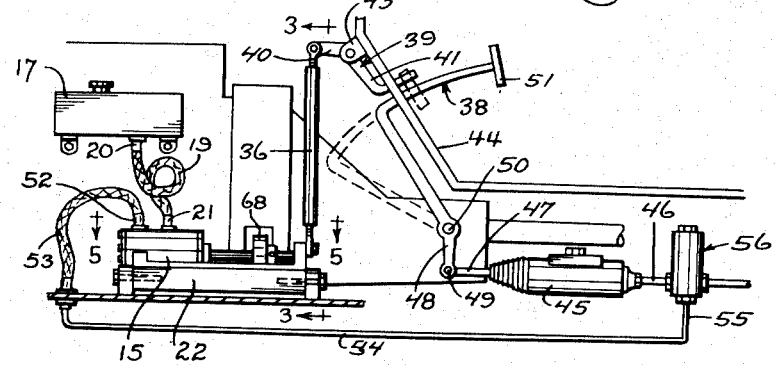
Figure 2 is a fragmentary side view of the auxiliary brake system shown in Figure 1.
Figure 3:
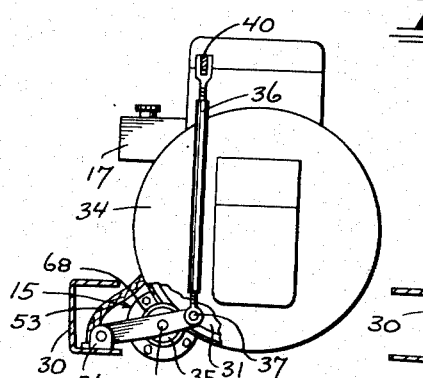
Figure 3 is a fragmentary sectional view as taken on the line 3—3 in Figure 2.
Figure 4:
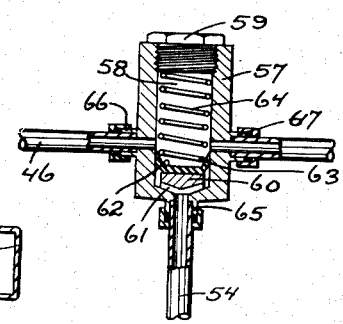
Figure 4 is an enlarged fragmentary sectional detail of the check valve as installed in the main fluid line of the main hydraulic brake system.
Figure 5:
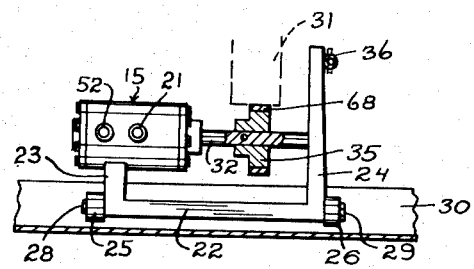
Figure 5 is a fragmentary sectional view as taken on the line 5—5 in Figure 2.

A connecting rod 36, having one end pivotally joined at 37 to the outer end of the bracket arm 24, extends upward from the same to a point above the opening in the floor boards for the foot brake 38, being pivoted at its upper end to a pivotal lever 39. This pivotal lever consists of two sections 40 and 41 connected to one another, the section 40 being a straight member to the outer end of which is pivoted the connecting rod 36, the section 41 of the lever being L-shaped, this portion being beneath the floor boards 44, the section 41 extending up through an opening in the floor of the car to project part ways therethrough, as shown in Figure 2. The lever 39 is pivotally mounted to the underside of the floor boards 44 by means of the bracket 43.

The master cylinder 45 of the main hydraulic brake system is of the conventional type, the main fluid line 46, leading from one end thereof, and having the piston shaft 47, extending from the opposite end, pivotally secured to the lower end of the pedal arm 48 at 49, and the pedal arm being pivoted at 50. A foot pedal 51 is mounted on the end of the pedal or brake arm extending above the floor boards. The projecting portion of the pivotal lever is in direct line with the pedal 51 of the foot brake.

Feed lines A lead from the main fluid line 46 to the brake cylinders B.

An auxiliary fluid line 54 extends from slightly forward of the hydraulic pump, which is preferably of the relief valve type adjustable up to approximately 600 lbs. pressure, in this instance, beneath the frame of the vehicle. An outlet 52 in the pump 15 has a connection 53 leading to the auxiliary fluid line, the end of which is suitably fitted to accommodate the connection. The auxiliary fluid line extends beneath the frame of the vehicle rearwardly to slightly beyond the rear end of the master cylinder, turning up at 55 to continue through the framework and connecting with the check valve 56 located on the main fluid line adjacent the rear of the master cylinder. This check valve could be located at any point on the main fluid line to the rear of the master cylinder.

The check valve 56 consists of a body portion 57 having a vertical opening forming a chamber 58 extending part ways thereinto. A threaded plug 59 is threaded into the open top of the chamber 58, forming a closure therefor. The fluid chamber is cylindrical and the bottom wall is tapered slightly and has a solid piston 60 freely seated thereon. This piston 60 is slightly smaller than the diameter of the tapered bottom portion of the fluid chamber 58, providing an annular space between the edge of the piston and the inner wall of the chamber. The under face of the piston is provided with grooves 61.

A rubber cup 62 is seated on the top face of the piston 60, the heel of the cup being on the piston and the lips 63 of the cup extend outward and against the inner wall of the fluid chamber. A spring 64 is located within the fluid chamber, having its top end against the lower end of the threaded bolt or plug 59, and its bottom end fitted into the lip portion of the cup. This spring exerts a downward pressure on the cup and on the metal piston upon which the cup is seated, as well as tending to keep the lip of the cup firmly against the wall of the fluid chamber.

The underside of the body portion 57 of the check valve 56 is formed with a boss 65, an opening extends upward through this boss and through the body portion and leading into the fluid chamber which is provided with an opening in the bottom thereof. The sides of the body portion 57 of the valve are each provided with a boss, 66 and 67 respectively, each of which has an opening extending horizontally therethrough and through the body portion and leading into the fluid chamber adjacent the bottom of same and being in alignment with one another. The main fluid line 46 of the main hydraulic system extends through the boss 66 to terminate in the fluid chamber. The main line is broken at the chamber to continue out through the opposite side of the valve where it is connected to the feed lines A.

The emergency or hydraulic fluid line 54 is connected to the hydraulic fluid pump 15 and leads therefrom to the fluid check valve 56, extending through the bottom of same, through the vertical opening in the boss 65, to terminate at the opening in the bottom of the fluid chamber.

In the operation of the auxiliary hydraulic brake system, should leakage or other failure occur in the master cylinder resulting in loss of compression, the pedal 51 will naturally go to the floor upon the brake being applied, and as this happens, the pedal 51 depresses the section 41 which, pivoting on the bracket 43, pulls the section 40 upwards, the connecting rod 36 also being lifted upwards. As the connecting rod moves upward, it pivots the mounting bracket 16 upwards, tilting the pump and its shaft, with the driving wheel thereon, so that the driving wheel 35 is brought into contact with the flywheel, which is revolving. The driving wheel 35 of the pump is provided with a rubber tire fixedly secured thereon, or this tire could be of any other suitable material providing maximum friction when the wheel is in contact with the flywheel.

The revolving flywheel of the motor revolves the drive wheel 35, the pump shaft being rotated thereby to operate the pump, pumping the emergency fluid from the tank through the auxiliary fluid line 54 and into the check valve 56 from which it enters the main fluid line for distribution to the brakes.

The fluid enters the fluid chamber 58 of the check valve through the hole in the bottom wall of same under the metal piston 60 and flows through the grooves in the underside of the piston, as it strikes that portion, and into the annular space, the pressure of the fluid forcing the soft resilient lip portion 63 of the rubber cup out from the wall of the chamber so that it may enter the main body of the chamber, and hence to the main fluid line leading therefrom.

The spring 64 fits snugly within the fluid chamber and exerts constant downward pressure on the rubber cup and the piston.

Figure 6:
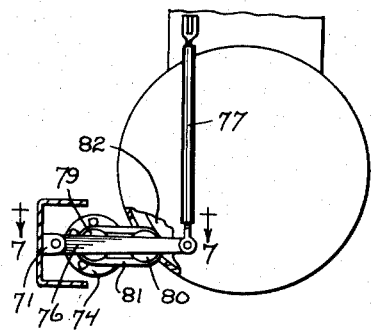
Figure 6 is a view similar to Figure 3, showing a modified form of pump drive.
Figure 7:
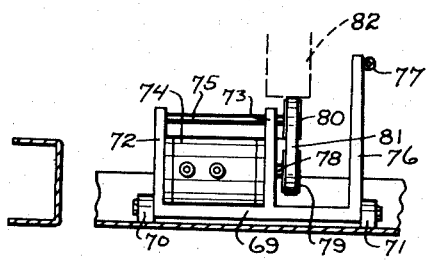
Figure 7 is a fragmentary sectional view as taken on the line 7—7 in Figure 6.

In the modification shown in Figures 6 and 7, the hook-up of the pump unit and the formation of the mounting bracket is slightly different to that hereinabove described. In this modified form, the pump mounting bracket 69 is pivotally supported between the two rigid uprights 70 and 71 respectively, and this bracket has a pair of spaced apart outwardly extending arms 72 and 73, the pump 74 being located between them and being supported thereby, the free ends of these arms rotatably supporting a shaft 75. A third arm 76 has the connecting rod 77 pivotally connected to it, as in the previously described hook-up.

In this instance the pump shaft 78 is provided with a V-pulley 79, the rotatable shaft 75 having a like V-pulley 80, the pulleys being connected by a belt 81 which projects above the edge of the pulleys to form a tire therefor.

Upon the connecting rod being actuated, in the same manner as heretofore described and illustrated, it pivots the bracket 69 to bring the belt 81 into contact with the revolving flywheel 82, the belt being turned and rotating the pulleys, the pulley 79 rotating the pump shaft to operate the pump.

Figures 8, 9:
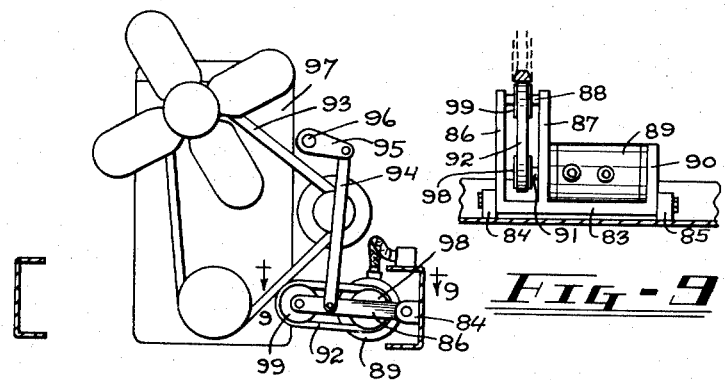
Figure 8 is a fragmentary front view showing a further modification of the pump drive.
Figure 9 is a fragmentary sectional detail as taken on the line 9—9 in Figure 8.

In the modification shown in Figures 8 and 9, the bracket 83 is slightly different to those hereinbefore described. This mounting bracket 83 is pivoted to the supports 84 and 85, and the bracket has a pair of long arms 86 and 87 at the outer end of which a rotatable shaft 88 is mounted, the shaft extending between the arms. The pump 89 is secured to the arm 87 and to a third arm 90 at the opposite end of the bracket, which arm is shorter than the arms 86 and 87.

The pump shaft 91 extends through the arm 87, being rotatable therein, and has a V-pulley secured thereto. A V-pulley is fixedly mounted to the rotatable shaft 88, these pulleys being located between the two arms 86 and 87 and having a belt 92 connecting them. The belt 92 is brought into contact with the fan belt 93 of the motor by means of the connecting rod 94, this rod 94 being connected to the operating arm 95. This arm 95 is fixedly secured to the shaft 96 which is rotatably mounted on the side of the motor 97. The shaft 96 is operated by the brake and pivotal lever which is connected to the other end of this shaft 96, the brake and lever action being similar to that hereinbefore described. Upon the belts 92 and 93 engaging one another, the pulleys 98 and 99 rotate to drive the pump shaft and operate the pump.

The aforementioned pump units, mounted to the mounting bracket, may be placed on either side of the motor, and be arranged on the frame of the car in the best manner suitable to the particular type of car to which it is being installed.

It is of course understood that modifications and ramifications may be made without in any way departing from the spirit of the invention as hereinabove described and illustrated.

What I claim is:

1. In a hydraulic brake system for motor vehicles, a main hydraulic brake system, an auxiliary hydraulic brake system, an auxiliary hydraulic pump having a shaft, an emergency fluid tank connected to said auxiliary hydraulic pump, a motor, a fly wheel connected to said motor, foot brake, a pedal connected to said foot brake, a master cylinder connected to the main fluid line of the main hydraulic brake system, a check valve connected to the main fluid line and to the rear of said master cylinder, an auxiliary fluid line connected to said auxiliary hydraulic pump and leading therefrom to and connecting with said check valve, said check valve being adapted to contain the emergency fluid within said auxiliary fluid line during normal operation of said master cylinder and to permit entry of the emergency fluid into the valve to be directed therethrough and into the main fluid line for distribution to and operation of the hydraulic brake cylinders of the hydraulic brake system, a drive wheel fixedly mounted to the shaft of said auxiliary hydraulic pump, operating mechanism comprising a connecting rod and pivotal lever having connection with said auxiliary pump, the pivotal lever of said operating mechanism adapted to be actuated by the pedal of the foot brake of said vehicle when the same fully depresses due to breakdown in said master cylinder rendering the main hydraulic brake system inoperative, said operating mechanism being adapted to move said auxiliary pump to bring said drive wheel on the shaft thereof into engagement with the rotating flywheel of the motor, the said drive wheel being thus driven by the flywheel to rotate the pump shaft, said auxiliary pump thus being adapted to pump emergency fluid from said emergency tank through said auxiliary fluid line to the main fluid line clear of the inoperative master cylinder.

2. In a hydraulic brake system for motor vehicles, a frame, a motor, a fly wheel connected to said motor, a foot brake having a pedal connected thereto, a main hydraulic brake system comprising a master cylinder and a main fluid line connected thereto, an auxiliary hydraulic brake system comprising, a mounting bracket pivotally mounted to supports fixedly secured to the frame of said vehicle adjacent the motor thereof, said mounting bracket consisting of an arm projecting outwardly from each end thereof and directed towards the motor, a hydraulic pump comprising a shaft rotatably connected thereto, said hydraulic pump being fixedly secured to one of said projecting arms of said mounting bracket, the free end of said shaft being rotatably mounted to the other of said arms of the mounting bracket, said pump being fixed with respect to said mounting bracket and being moveable therewith, a drive wheel fixedly mounted on said shaft of said pump, an emergency fluid tank fixedly secured to the motor casing and being connected to said hydraulic pump, an auxiliary fluid line, a check valve connected to the main fluid line rearward of the master cylinder of the hydraulic system of said vehicle, said auxiliary fluid line being connected to said hydraulic pump and leading therefrom to said check valve and being connected thereto, said check valve being adapted to prevent emergency fluid in said auxiliary fluid line from entering the main fluid line during normal operation of the master cylinder and to permit the emergency fluid entry to the main fluid line upon the master cylinder becoming inoperative, operating mechanism connected to said mounting bracket and being adapted to be actuated by the pedal of the foot brake upon the same being fully depressed due to breakdown in the master cylinder, the said operating mechanism causing said mounting bracket to pivot, bringing said drive wheel on said shaft of said pump into engagement with the flywheel of the motor which member rotates said shaft to operate said hydraulic pump, the latter pumping emergency fluid through said auxiliary fluid line to said check valve, said check valve now permitting the emergency fluid to flow therethrough and into the main fluid line.

3. In a hydraulic brake system for motor vehicles, a vehicle comprising a frame, a motor, a fly wheel connected to said motor, a foot brake having a pedal connected thereto, a main hydraulic brake system, a main fluid line and a master cylinder connected to said main fluid line, an auxiliary hydraulic brake system comprising, an auxiliary hydraulic pump having a shaft connected thereto, of the relief valve type movably supported on legs fixedly secured to and extending vertically upward from the frame of the vehicle adjacent the motor thereof, a drive wheel fixedly mounted to the shaft of said pump, an emergency fluid tank being suitably located and connected to said hydraulic pump, an auxiliary fluid line connected to said pump and leading therefrom rearwards of the vehicle, a check valve connected to the main fluid line rearwardly of said master cylinder, said check valve comprising a body portion having a cylindrical chamber extending vertically part ways therethrough and an aperture extending through two sides of the body portion and being in alignment with one another and leading into said chamber adjacent the bottom of same, the bottom of said body portion having an aperture therethrough leading into said chamber, the main fluid line being connected to said check valve through one of the side apertures thereof and being broken to continue out through the other of the side apertures where it is connected to the master cylinder, said auxiliary fluid line extending through the aperture in the bottom of said check valve and leading into the said chamber, a threaded plug fitting into the open upper end of said chamber in said check valve, a metal piston seated on the bottom of said chamber and being of smaller diameter than the interior of the chamber, a rubber cup being seated on the said piston, a lip portion extending outward on said cup and abutting the wall of the chamber, a spring member located within said chamber having one end thereof against the underside of said threaded plug and its other end fitting into said cup between the said lip portion thereof and being adapted to exert constant downward pressure on said cup and said piston to keep same firmly seated within said chamber, and operating mechanism connected to said hydraulic pump and leading therefrom to a position under the pedal of the foot brake and adapted to be actuated by the full depression of the foot brake pedal thereagainst upon breakdown occurring in said master cylinder, said operating mechanism thereupon acting to move said pump towards the motor bringing said drive wheel into engagement with the flywheel of the motor to be driven by same, thus operating said pump, the same pumping the emergency fluid through said auxiliary fluid line and into said chamber in said check valve, the said piston in the chamber adapted to permit the emergency fluid to flow into the chamber and up against the lip portion of said rubber cup forcing the same outward from the wall of the chamber and permitting the fluid to flow into the body of the chamber where it continues into the main fluid line clear of the now inoperative master cylinder for distribution to and the operation of the brake cylinders of the hydraulic brake system.

STEVE JOANIS.

References Cited in the file of this patent

UNITED STATES PATENTS

| Number | Name | Date |
|---|---|---|
| 2,170,593 | Moore | Aug. 22, 1939 |
| 2,499,775 | Piganeau | Mar. 7, 1950 |